March 5, 1929.  L. O. GRONDAHL  1,704,679
UNIDIRECTIONAL CURRENT CARRYING DEVICE
Original Filed Jan. 7, 1925
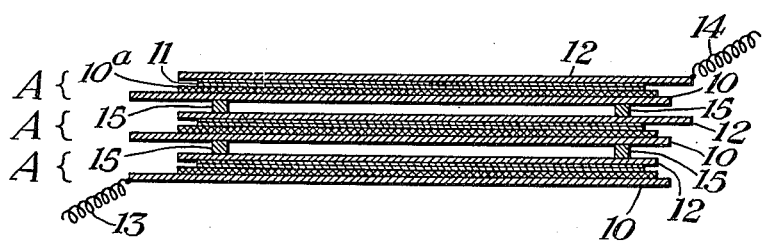
INVENTOR:
L. O. Grondahl,
by A. R. Vincill
His Attorney Patented Mar. 5, 1929.

1,704,679

UNITED STATES PATENT OFFICE.

LARS O. GRONDAHL, OF PITTSBURGH, PENNSYLVANIA, ASSIGNOR TO THE UNION SWITCH & SIGNAL COMPANY, OF SWISSVALE, PENNSYLVANIA, A CORPORATION OF PENNSYLVANIA.

UNIDIRECTIONAL-CURRENT-CARRYING DEVICE.

Original application filed January 7, 1925, Serial No. 1,111. Divided and this application filed July 28, 1927. Serial No. 209,016.

My invention relates to unidirectional current carrying devices, that is, to devices which have relatively high conductivity for current flowing in one direction but relatively low conductivity for current flowing in the opposite direction.

The present application is a division of my co-pending application, Serial No. 1,111, filed January 7, 1925, for unidirectional current carrying devices.

I will describe one form of device embodying my invention, and will then point out the novel features thereof in claims.

The accompanying drawing is a sectional view showing one form of device embodying my invention.

Referring to the drawing, the device comprises a plurality of units, each of which is designated by the reference character A. Each unit A comprises a metal plate or electrode 10, and an electronically conducting compound $10^a$ in intimate electrical contact with the surface of the plate. The compound $10^a$ is preferably a compound of the metal which constitutes the plate, and preferably it is formed directly on the plate and is integral therewith. As an example, the plate 10 may be of copper, and the compound $10^a$ may be cuprous oxide. As another example, the metal plate 10 may be iron, and the compound may then be iron oxide. Against the layer of oxide $10^a$ is placed a second electrode comprising one or more sheets 11 of a conductor of a soft, impressionable character, such, for example, as lead foil, and next to the conductor 11 is another plate 12 of conductive material, such as copper.

The units A are spaced by separators 15 of conducting material to provide for ventilation.

The elements of the device are pressed together by means not shown in the drawing, and the two outside metal plates 10 and 12 are used as terminals for passing electric current through the device; for this purpose terminal conductors 13 and 14 may be provided, if desired.

Although I have herein shown and described only one form of device embodying my invention, it is understood that various changes and modifications may be made therein within the scope of the appended claims without departing from the spirit and scope of my invention.

Having thus described my invention, what I claim is:

1. A unidirectional current carrying device comprising a plurality of units connected in series and electro-conductive spacing blocks of relatively small size located between each two adjacent units to provide for ventilation by the circulation of air.

2. A unidirectional current carrying device comprising a plurality of units connected in series, each unit being made up of a copper electrode having cuprous oxide formed chemically thereon, and electro-conductive spacing blocks of relatively small size located between each two adjacent units to provide for ventilation by the circulation of air.

3. A unidirectional current carrying device comprising a plurality of units connected in series, each unit consisting of a body made up of a metal having an electronically conducting compound of the metal formed thereon and integral therewith, said body constituting in and by itself an asymmetric conductor, and electro-conductive spacing blocks of relatively small size located between each two adjacent units to provide for ventilation by the circulation of air.

4. A unidirectional current carrying device comprising a plurality of units connected in series, each unit consisting of a body made up of copper having cuprous oxide formed thereon and integral therewith, said body constituting in and by itself an asymmetric conductor, and electro-conductive spacing blocks of relatively small size located between each two adjacent units to provide for ventilation by the circulation of air.

In testimony whereof I affix my signature.

LARS O. GRONDAHL.